US 12,499,919 B2

(12) United States Patent
Yachareni et al.

(10) Patent No.: US 12,499,919 B2
(45) Date of Patent: Dec. 16, 2025

(54) ADAPTIVE WRITE SCHEME FOR MEMORY DEVICES

(71) Applicant: XILINX, INC., San Jose, CA (US)

(72) Inventors: Santosh Yachareni, Hyderabad (IN); Sree Rama Krishna Chaithnya Saraswatula, Hyderabad (IN); Shidong Zhou, Hyderabad (IN); Anil Kumar Kandala, Hyderabad (IN); Narendra Kumar Pulipati, Hyderabad (IN)

(73) Assignee: XILINX, INC., San Jose, CA (US)

( * ) Notice: Subject to any disclaimer, the term of this patent is extended or adjusted under 35 U.S.C. 154(b) by 178 days.

(21) Appl. No.: 18/235,739

(22) Filed: Aug. 18, 2023

(65) Prior Publication Data

US 2025/0061926 A1    Feb. 20, 2025

(51) Int. Cl.
*G11C 7/08* (2006.01)
*G11C 7/10* (2006.01)
*G11C 7/20* (2006.01)

(52) U.S. Cl.
CPC ............ *G11C 7/08* (2013.01); *G11C 7/1057* (2013.01); *G11C 7/20* (2013.01)

(58) Field of Classification Search
CPC ............ G11C 7/08; G11C 7/1057; G11C 7/20; G11C 5/147; G11C 11/417
USPC ............................................. 365/191, 230.06
See application file for complete search history.

(56) References Cited

U.S. PATENT DOCUMENTS

2022/0165350 A1* 5/2022 Morishita ........... G11C 11/4096

* cited by examiner

*Primary Examiner* — Huan Hoang
(74) *Attorney, Agent, or Firm* — Patterson + Sheridan, LLP

(57) ABSTRACT

Memory driver circuitry for driving a memory cell or cells of a memory device includes first driver path circuitry and selection circuitry. The first driver path circuitry includes driver circuitry that outputs a first signal and selection circuitry that receives the first signal and a second signal, and outputs a first selected signal. The first selected signal is a selected one of the first signal and the second signal. The selection circuitry of the memory driver circuitry receives a third signal and a fourth signal, and outputs a bias voltage signal to header circuitry of a memory cell. The bias voltage signal is a selected one of the third signal and the fourth signal. The third signal corresponds to the first selected signal.

20 Claims, 2 Drawing Sheets

ADAPTIVE WRITE SCHEME FOR MEMORY DEVICES

TECHNICAL FIELD

Examples of the present disclosure generally relate to a driver circuitry for memory devices that outputs a bias signal having a voltage level that corresponds to a power mode of the memory device.

BACKGROUND

Integrated circuit (IC) devices include memory cells, which are embedded within the IC, forming an embedded memory. The memory cells are often static random access memory (SRAM), but can be another memory type. The memory cells are used as a configuration memory within an IC device, forming a configuration random access memory (CRAM). In a programmable IC device (e.g., a field programmable gate array, FPGA) the CRAM memory cells include storage nodes that connect to neighboring circuit elements of the IC device to configure programmable logic of the FPGA and other IC devices. Configuration data is loaded into the CRAM memory cells, which is used to configure the programmable logic of the FPGA and other IC devices.

SUMMARY

In one example, a memory driver circuitry includes first driver path circuitry and selection circuitry. The first driver path circuitry includes driver circuitry that outputs a first signal and selection circuitry that receives the first signal and a second signal, and outputs a first selected signal. The first selected signal is a selected one of the first signal and the second signal. The selection circuitry of the memory driver circuitry receives a third signal and a fourth signal, and outputs a bias voltage signal to header circuitry of a memory cell. The bias voltage signal is a selected one of the third signal and the fourth signal. The third signal corresponds to the first selected signal.

In one example, an integrated circuit (IC) device includes a memory cell, header circuitry that drives the memory cell, and memory driver circuitry. The memory driver circuitry includes first driver path circuitry and selection circuitry. The first driver path circuitry includes driver circuitry and selection circuitry. The driver circuitry outputs a first signal. The first selection circuitry receives the first signal and a second signal, and outputs a first selected signal. The first selected signal is a selected one of the first signal and the second signal. The second selection circuitry of the memory driver circuitry receives a third signal and a fourth signal, and outputs a bias voltage signal to the header circuitry. The bias voltage signal is a selected one of the third signal and the fourth signal. The third signal corresponds to the first selected signal.

In one example, memory driver circuitry including first driver path circuitry, second driver path circuitry, and selection circuitry. The first driver path circuitry includes driver circuitry and selection circuitry. The driver circuitry outputs a first signal. The selection circuitry receives the first signal and a second signal, and outputs a first selected signal. The first selected signal is a selected one of the first signal and the second signal. The second driver path circuitry includes emulation circuitry that outputs a third signal. Parameters of transistors of the emulation circuitry are configured based on parameters of transistors of a memory cell. The selection circuitry of the memory driver circuitry receives a fourth signal, a fifth signal, and a sixth signal, and outputs a bias voltage signal to header circuitry connected to the memory cell. The bias voltage signal is a selected one of the fourth signal, the fifth signal, and the sixth signal. The fourth signal corresponds to the first selected signal, and the fifth signal corresponds to the third signal.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 3 illustrates a circuit diagram of a memory cell.

FIG. 4 illustrates a block diagram of integrated circuit device.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
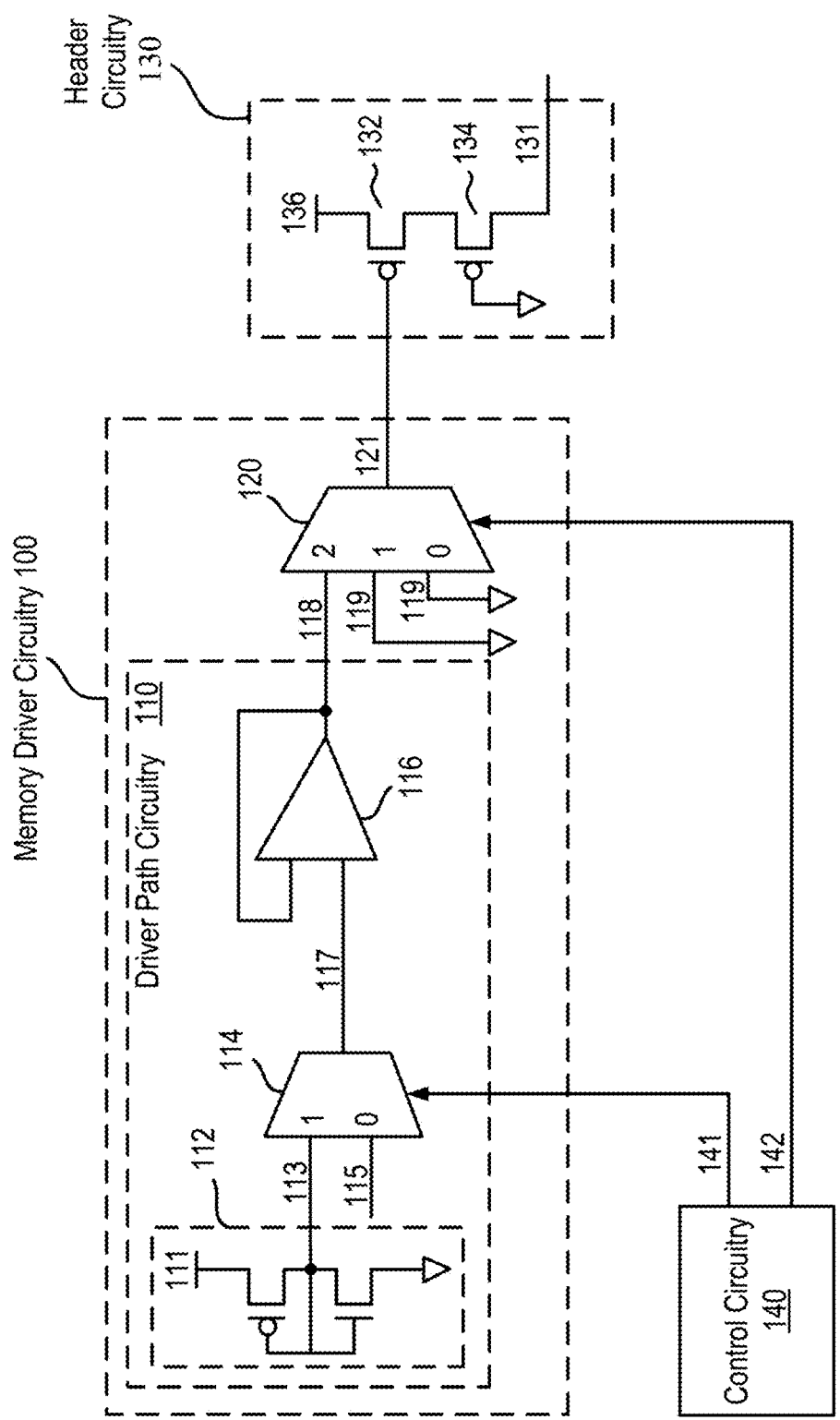
FIG. 1 illustrates a circuit diagram of memory driver circuitry and header circuitry for a memory cell.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Integrated circuit (IC) devices include configurable logic that is configured via configuration memory. In one example, the configuration memory is included within the IC device as an embedded memory and includes memory cells. The memory cells may be static random access memory (SRAM) type memory cells. In other examples, the memory cells are other types of memory cells. In one or more example, the memory cells form a configuration random access memory (CRAM) within the IC device. Memory cells are interconnected with each other and to other circuit elements within the IC device. Configuration data is loaded into the memory cells and used to configure the functionality of the programmable logic of a corresponding IC device.

Each of the memory cells includes multiple transistors that are used to control operation of the memory cell and to store the corresponding data. In one example, a memory cell is a six transistor (6-T) memory cell. In other examples, memory cells having more or less than six transistors may be used. However, at more advanced technology nodes (e.g., technology nodes beyond 7 nm) performance of a 6-T memory cell degrades. For example, the write margin (e.g., the write trip point, that is bit-line voltage used to flip the state of the memory cell) decreases as the technology node increases. Weaker pull-up transistors may be used in the inverters of the memory cell to increase the write margin. However, at technology nodes beyond 7 nm, any performance gains provided by using weak pull-up transistors are offset by bitline and memory cell current leakage. In such instances, additional header circuitry may be used to further weaken the pull-up transistors, increasing the write margin of the memory cell. However, in lower technology nodes and/or in instances that have to function with a reduced supply voltage, the write margin may limit the yield of the memory cells.

In a CRAM, the memory cells store important configuration data that is used to configure the programmable logic of an IC device. In such devices, there is no redundancy within the CRAM. Accordingly, a high yield percentage of the memory cells is desirable. In the following, an improved drive technique for a memory cell is described that increases the write margin of a memory cell. For example, the improved drive technique includes using drive circuitry that selects from multiple voltages to output as a bias voltage signal. In one example, a first voltage is selected as the bias voltage signal during a first power mode and a second voltage is selected as the bias voltage signal during a second power mode. In one example, the drive circuitry includes dynamic voltage generation circuitry that generates a voltage signal based on the parameters of the memory cell. The output of the dynamic voltage generation circuitry is selected during the second power mode as the bias voltage signal instead of the second voltage, further increasing the write margin of a memory cell.

FIG. 1 illustrates a schematic circuit design of a memory driver circuitry 100 connected to header circuitry 130, according to one or more examples. The memory driver circuitry 100 includes driver path circuitry 110 and selection circuitry 120. The driver path circuitry 110 includes driver circuitry 112, selection circuitry 114, and buffer circuitry 116. The driver circuitry 112 generates the voltage signal 113. The driver circuitry 112 is driven between by a voltage signal supplied at the node 111 and a ground signal (or another reference voltage signal). The voltage level of the voltage signal 113 corresponds to the difference in voltage between the voltage of the voltage signal driven on node 111 and the threshold voltage of the transistors of the driver circuitry 112. Accordingly, the voltage level of the voltage signal 113 is less than the voltage level of the voltage signal driven on the node 111. In one example, the voltage signal 113 has a voltage value of about 0.3 V. In other examples, the voltage signal 113 has a voltage value that is greater than or less than 0.3 V. Further, the voltage signal 113 may have a voltage value that is less than the voltage value of the voltage signal 115.

A second input, e.g., input 1, of the selection circuitry 114 is connected to the output of the driver circuitry 112, and receives the voltage signal 113 from the driver circuitry 112. The first input, e.g., input 0, of the selection circuitry 114 receives the voltage signal 115. The voltage signal 115 has a voltage value of about 300 mV to about 700 mV. In other examples, the voltage value of the voltage signal 115 has a value of less than 300 mV and/or greater than 700 mV. Further, the voltage value of voltage signal 115 corresponds to parameters of the technology node of transistors of a memory cell driven by the header circuitry 130 and/or the parameters of transistors of the technology node of the header circuitry 130.

The selection circuitry 114 outputs the signal 117. In one or more examples, the selection circuitry 114 is a multiplexer (e.g., a 2 input to 1 output (2:1) multiplexer). In other examples, the selection circuitry 114 is another type of selection circuitry. In one example, the selection circuitry 114 receives the control signal 141 from the control circuitry 140. The selection circuitry 114 selects the voltage signal 113 or the voltage signal 115 to output as the signal 117 based on the logic value of the control signal 141. For example, when the control signal 141 has a logic value of 1, the selection circuitry 114 selects the voltage signal 113 from input 1 to output as the signal 117. Further, when the control signal 141 has a logic value of 0, the selection circuitry 114 selects the voltage signal 115 from input 0 to output as the signal 117.

In one example, the logic value of the control signal 141 corresponds to a power mode of the memory driver circuitry 100, the header circuitry 130, and/or the memory cells driven by the header circuitry 130. For example, before initiation of a power on mode of the memory driver circuitry 100, the header circuitry 130, and/or the memory cells driven by the header circuitry 130, the control signal 141 provides an indication to the selection circuitry 114 to select the voltage signal 113 output from the driver circuitry 112. In the example of FIG. 1, the control signal 141 has a logic value of 1 before power on. Further, after initiation of a power on mode of the memory driver circuitry 100, the header circuitry 130, and/or the memory cells driven by the header circuitry 130, the control signal 141 provides an indication to the selection circuitry 114 to select the voltage signal 115. In the example of FIG. 1, the control signal 141 has a logic value of 0 after power on.

The buffer circuitry 116 receives the signal 117 and outputs the signal 118. An input to the buffer circuitry 116 is connected to the output of the selection circuitry 114. In one example, the buffer circuitry 116 is a unity gain buffer.

The selection circuitry 120 has two or more inputs. In one example, a first input of the selection circuitry 120 is connected to the output of the buffer circuitry 116, and a second input of the selection circuitry 120 is connected to a voltage node that receives a ground signal 119. In one or more examples, a third input of the selection circuitry 120 is connected to a voltage node that receives the ground signal 119. In one or more examples, the selection circuitry 120 is a multiplexer (e.g., a 2:1 or a 3:1 multiplexer). In other examples, the selection circuitry 120 is another type of selection circuitry.

The selection circuitry 120 outputs the bias voltage signal 121. The bias voltage signal 121 is a selected one of the signals 118 and 119. For example, the selection circuitry 120 receives the control signal 142, and selects one of the signals 118 and 119 to be output as the bias voltage signal 121 based on a logic value of the control signal 142. For example, based on the control signal 142 having a logic value of 2, the selection circuitry 120 outputs the signal 118 as the bias voltage signal 121. Further, based on the control signal 142 having a logic value of 0 or 1, the selection circuitry 120 outputs the ground signal 119 as the bias voltage signal 121.

In one example, setting the logic value of the control signal 142 to 0 or 1 bypasses the driver path circuitry 110 and couples the header circuitry 130 to the ground signal 119. In one example, the driver path circuitry 110 is bypassed based on the parameters of the header circuitry 130 and/or the corresponding memory cells driven by the header circuitry 130. For example, the driver path circuitry 110 is bypassed based on a determination that the ground signal 119 provides a bias signal that provides a write duration to write to the memory cells driven by the header circuitry 130.

The header circuitry 130 includes transistor 132 and transistor 134. The transistors 132 and 134 are p-channel metal-oxide semiconductor (PMOS) transistors. The source node of transistor 132 is connected the node 136. The node 136 receives the voltage signal Vgg. The voltage of the voltage signal Vgg is a temperature dependent voltage signal regulated by power supply circuitry. In one example, the voltage of the voltage signal Vgg is 1.051 V at 40° C., and 0.989 V at 125° C. on. In other examples, the voltage signal Vgg has other voltage values. The gate node of the transistor 132 is connected to the output of the selection circuitry 120, and receives the bias voltage signal 121. The drain node of the transistor 132 is connected to a source node of the transistor 134. The gate node of the transistor 134 is coupled to a voltage node that receives a ground signal (e.g., the ground signal 119). The drain node of the transistor 134 outputs the voltage signal 131.

The voltage level of the voltage signal 131 corresponds to the voltage level of the bias voltage signal 121 and the voltage level of the voltage signal at the node 136. In one example, the voltage level of the voltage signal 131 is less than the voltage signal at the node 136. The difference between the voltage level of the voltage signal 131 and the voltage level of the voltage signal at the node 136 is based on the voltage level of the bias voltage signal 121.

Figure 2:
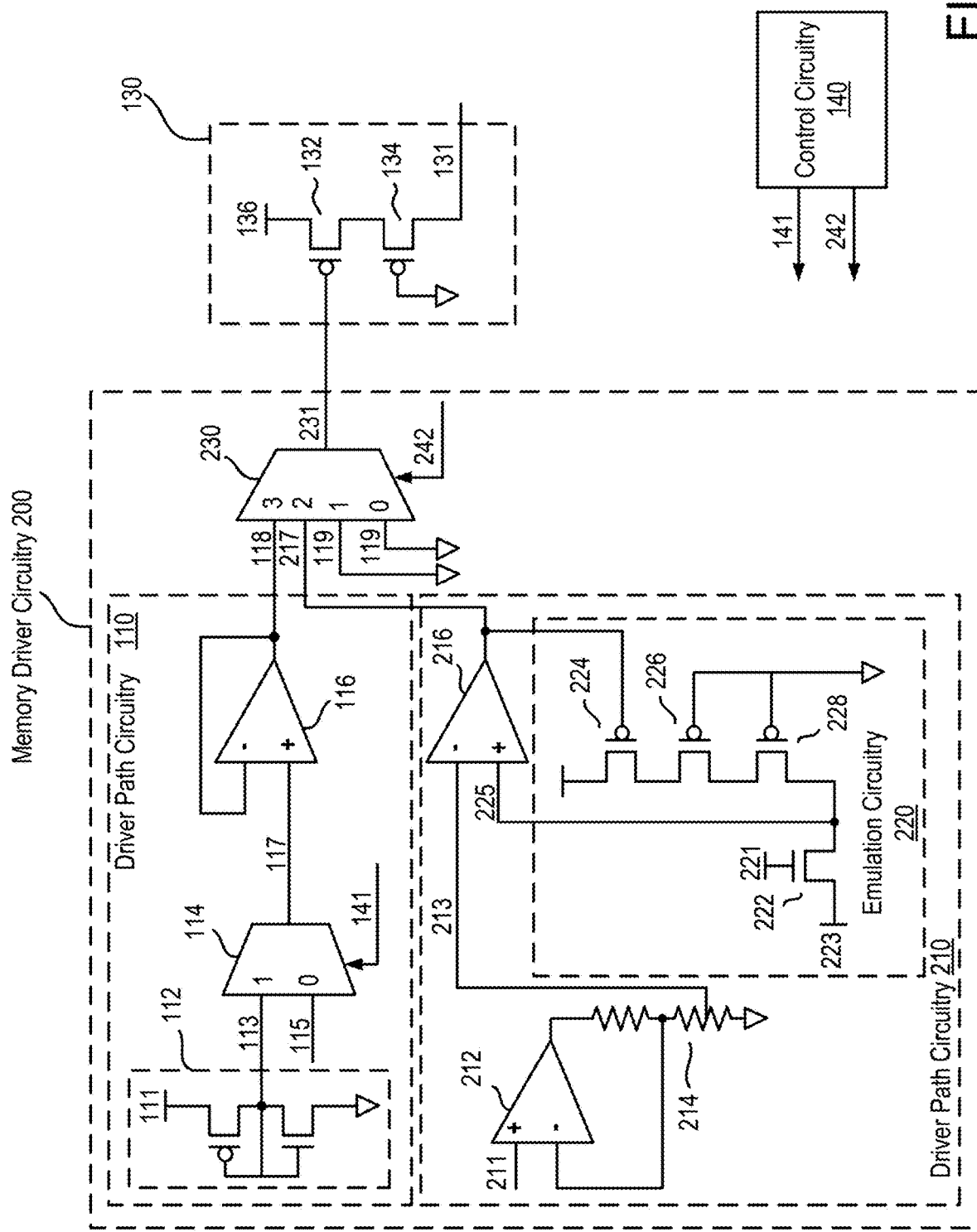
FIG. 2 illustrates a circuit diagram of memory driver circuitry and header circuitry for a memory cell.

FIG. 2 is a circuit diagram of memory driver circuitry 200 connected to the header circuitry 130. The memory driver circuitry 200 includes the driver path circuitry 110, driver path circuitry 210, and selection circuitry 230. The driver path circuitry 110 is described in greater detail with regard to FIG. 1. The driver path circuitry 210 includes amplifier circuitry 212, amplifier circuitry 216, and emulation circuitry 220.

In one example, the amplifier circuitry 212 is an operational amplifier. A first input of the amplifier circuitry 212 receives the voltage signal 211. The voltage level of the voltage signal 211 is about 1 V or about −1 V. The output of the amplifier circuitry 212 is connected to voltage divider circuitry 214. The voltage divider circuitry 214 includes one or more resistors. A first output of the voltage divider circuitry 214 provides a feedback path for the amplifier circuitry 212. A second output of the voltage divider circuitry 214 outputs the signal 213. The signal 213 has a voltage level that is less than that of the voltage signal 211. The voltage level of the signal 213 corresponds to a resistor ratio between the input and output node of the voltage divider circuitry 214. In one example, the voltage level of the signal 213 is about 50 mV to about 500 mV. In other example, the voltage level of the signal 213 is less than about 50 mV and/or greater than about 500 mV.

A first input of the amplifier circuitry 216 is connected to the output of the voltage divider circuitry and receives the signal 213. The first input is a negative input of the amplifier circuitry 216. A second input of the amplifier circuitry 216 is connected to an output of the emulation circuitry 220 and receives the signal 225 from the emulation circuitry 220. The second input is a positive input of the amplifier circuitry 216. The amplifier circuitry outputs the signal 217.

The emulation circuitry 220 is configured similar to the memory cells driven by the header circuitry 130. For example, the emulation circuitry 220 includes transistor 222 that functions as a pass gate circuit similar to a pass gate circuit (e.g., transistors 310 and 320 of FIG. 3) of a memory cell (e.g., the memory cell 300 of FIG. 3). The technology process used to form the transistor 222 is the same as the technology process used to form the pass gate transistors of the corresponding memory cell. The gate of the transistor 222 is connected to the voltage node 221 that receives a voltage signal, which corresponds to a write voltage for a memory cell.

The transistors 224, 226, and 228 are configured similar to the transistors of the inverters (e.g., inverter circuitries 330 and 340 of FIG. 3) of the memory cells (e.g., the memory cell 300 of FIG. 3). For example, the technology process used to form the transistors 224, 226, and 228 is the same as the technology process used to form the transistors of the inverters of the corresponding memory cell. The transistors 224, 226, and 228 are PMOS transistors. In one example, the transistors 224, 226, and 228 form a transistor string.

The voltage level of the signal 225 is based on a ratio of the voltage level at the output the transistor 228 and the transistor 222. The transistors 224, 226, and 228 provide a feedback path for the output of the amplifier circuitry 216 to be fed back to the input of the amplifier circuitry 216 as the signal 225. Accordingly, the transistors 224, 226, and 228 generate a signal that is based on the parameters of the technology process used to form the transistors of the corresponding memory cells (e.g., the memory cell 300 of FIG. 3). In one example, the voltage level of the signal 217 corresponds to a difference in the voltage levels of the signal 213 and 225.

The selection circuitry 230 has three or more inputs. In one example, a first input of the selection circuitry 230 is connected to the output of the buffer circuitry 116, a second input of the selection circuitry 230 is connected to an output of the driver path circuitry 210, and a third input of the selection circuitry 230 is a voltage node that receives a ground signal 119. In one or more examples, a fourth input of the selection circuitry 230 is connected to a voltage node that receives the ground signal 119. In one or more examples, the selection circuitry 230 is a multiplexer (e.g., a 3:1 or a 4:1 multiplexer). In other examples, the selection circuitry 230 is another type of selection circuitry.

The selection circuitry 230 outputs the bias voltage signal 231. The bias voltage signal 231 is a selected one of the signals 118, 217, and 119. For example, the selection circuitry 230 receives the control signal 242, and selects one of the signals 118, 217, and 119 to be output as the bias voltage signal 231 based on a logic value of the control signal 242. For example, based on the control signal 242 having a logic value of 3, the selection circuitry 230 outputs the signal 118 as the bias voltage signal 231. Based on the control signal 242 having a logic value of 2, the selection circuitry 230 outputs the signal 217 as the bias voltage signal 231. Further, based on the control signal 242 having a logic value of 0 or 1, the selection circuitry 230 outputs the ground signal 119 as the bias voltage signal 231.

In one example, setting the logic value of the control signal 242 to 0 or 1 bypasses the driver path circuitry 110 and couples the header circuitry 130 to the ground signal 119. In one example, the driver path circuitry 110 and the driver path circuitry 210 are bypassed based on the parameters of the header circuitry 130 and/or the corresponding memory cells driven by the header circuitry 130. For example, the driver path circuitry 110 and the driver path circuitry 210 are bypassed based on a determination that the ground signal 119 provides a bias signal that provides a write duration to write to the memory cells driven by the header circuitry 130.

In one example, the control circuitry 140 generates the control signal 141 and the control signal 242 to control the selection circuitry 114 and the selection circuitry 230 to select the voltage signals 113 and 118, respectively. For example, at power on of the memory driver circuitry 200, the header circuitry 130, and/or the memory cells driven by the header circuitry 130, the control signal 141 and the control signal 242 control the selection circuitry 114 and the selection circuitry 230 to select the voltage signals 113 and 118, respectively. In one example, the control circuitry 140 generates the control signal 141 and the control signal 242 to control the selection circuitry 114 and the selection circuitry 230 to select the voltage signals 115 and 118, respectively. For example, after power on of the memory driver circuitry 200, the header circuitry 130, and/or the memory cells driven by the header circuitry 130, the control signal 141 and the control signal 242 control the selection circuitry 114 and the selection circuitry 230 to select the voltage signals 115 and 118, respectively. In another example, the control circuitry 140 generates the control signal 242 to control the selection circuitry 230 to select the signals 217. For example, after power on of the memory driver circuitry 200, the header circuitry 130, and/or the memory cells driven by the header circuitry 130, the control signal 242 controls the selection circuitry 230 to select the signal 217.

In one example, the voltage signal 115 is selected and output as the signal 118 and the bias voltage signal 231 based on characterization of the corresponding memory cells. For example, based on a determination that a write duration generated by the voltage level of the voltage signal 115 is within the operating parameters of the memory cells driven by the header circuitry 130, the voltage signal 115 is selected and output as the signal 118 and the bias voltage signal 231. Further, in one or more examples, the signal 217 is selected and output as the bias voltage signal 231 based on characterization of the corresponding memory cells. For example, based on a determination that a write duration generated by the voltage level of the signal 217 is within the operating parameters of the memory cells driven by the header circuitry 130, the signal 217 is selected and output as the bias voltage signal 231. In one example, one or more registers within the control circuitry 140 is set based on a characterization of the memory cells to provide the control circuitry 140 an indication as to which of the signals to select during power on and after power on.

FIG. 3 illustrates a circuit diagram of a memory cell 300, according to one or more examples. The memory cell 300 includes transistors 310 and 320, and inverter circuitries 330 and 340. The transistors 310 and 320 are PMOS transistors. Further, a gate node of the transistors 310 and 320 are connected to the node 302. The node 302 receives a write voltage signal. In one example, based on the write voltage signal having a high voltage value, the transistors 310 and 320 are turned on, and the voltages at the nodes 304 and 306 update the inverter circuitries 330 and 340. Based on the write voltage signal having a low voltage value, the transistors 310 and 320 are turned off, and the inverters are not updated. The inverter circuitries 330 and 340 are driven with the voltage signal 131 generated by the header circuitry 130 of FIG. 1 or FIG. 2.

In one example, the memory cell 300 is formed using a technology process of 7 nm or less. In one or more examples, the memory cell 300 is formed using a technology process of 2 nm or less.

The memory cell 300 may be integrated within an IC device, forming an embedded memory. For example, the memory cell 300 may be part of a SRAM, or another memory type. In one or more examples, the memory cell 300 is used as part of a configuration memory within an IC device, forming a CRAM.

In one or more examples, the memory driver circuitry 100 or the memory driver circuitry 200, and the header circuitry 130 are integrated within an IC device. An IC device may include multiple instances of the memory driver circuitry 100 or the memory driver circuitry 200, and the header circuitry 130. In one example, the memory driver circuitry 100 or the memory driver circuitry 200, and/or the header circuitry 130 is connected to multiple memory cells within the IC device. FIG. 4 illustrates an example IC device 400. In one example, the IC device 400 is a field-programmable gate array (FPGA). The IC device 400 may be implemented as a programmable device according to some examples. In other embodiments, the IC device 400 may be another type of programmable IC device. The IC device 400 includes a large number of different programmable tiles that form a programmable fabric including configurable logic blocks (CLBs) 402, random access memory blocks (BRAMs) 404, signal processing blocks (DSPs) 406, input/output blocks (IOBs) 408, and configuration and clocking logic (CONFIG/CLOCKS) 410. The IC device 400 also includes a dedicated processor block 412, digital transceivers 414, dedicated hardblocks 416, specialized input/output blocks (IO) 418 (e.g., configuration ports and clock ports), and other programmable logic 420 such as digital clock managers, system monitoring logic, and so forth. The hardblocks 416 can be any circuit, such as a memory controller, a Peripheral Component Interconnect Express (PCIe) hardblock, etc.

In the illustrated IC device 400, each programmable tile includes a programmable interconnect element 430 having connections to input and output terminals of respective programmable interconnect elements 430 in each adjacent tile and having connections to input and output terminals of a programmable logic element within the same tile. The programmable interconnect elements 430 taken together implement a programmable interconnect structure for the illustrated FPGA 800.

As an example, a CLB 402 includes a configurable logic element (CLE) 432 that can be programmed to implement user logic plus a single programmable interconnect element 430. In one example, the memory driver circuitry 100 or the memory driver circuitry 200 is included within one or more CLBs and drives the CLE 432. A CLE 432 includes one or more memory cells 300. Further a CLE 432 includes one or more header circuitries 130, or a header circuitry 130 drives multiple CLEs 432.

A BRAM 404 can include a BRAM logic element (BRL) 434 in addition to one or more programmable interconnect elements 430. Typically, the number of interconnect elements included in a tile depends on the height of the tile. In the illustrated example, a BRAM tile has the same height as five CLBs, but other numbers (e.g., four) can also be used. A signal processing block 406 can include a DSP logic element (DSPL) 836 in addition to an appropriate number of programmable interconnect elements 430. An input/output block 408 can include, for example, two instances of an input/output logic element (IOL) 438 in addition to one instance of the programmable interconnect element 430. As will be clear to those of skill in the art, the actual I/O pads connected, for example, to the input/output logic element 838 typically are not confined to the area of the input/output logic element 438.

In the illustrated example, a horizontal area near the center of the die is used for configuration, clock, and other control logic. Vertical columns 440 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 412 spans several columns of CLBs and BRAMs.

Note that FIG. 4 is intended to illustrate only an exemplary IC device architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual FPGA, more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A memory driver circuitry comprising:
   first driver path circuitry comprising:
      driver circuitry configured to output a first signal; and
      first selection circuitry configured to receive the first signal and a second signal, and output a first selected signal, wherein the first selected signal is a selected one of the first signal and the second signal;
   second driver path circuitry configured to output a third signal; and
   second selection circuitry configured to receive a fourth signal, a fifth signal, and a sixth signal, and output a bias voltage signal to header circuitry of a memory cell, wherein the bias voltage signal is a selected one of the fourth signal, the fifth signal, and the sixth signal, the fourth signal corresponds to the first selected signal, the fifth signal corresponds to the third signal, and the third signal is based on parameters of the memory cell.

2. The memory driver circuitry of claim 1, wherein the first driver path circuitry further comprises buffer circuitry configured to receive the first selected signal and output the fourth signal.

3. The memory driver circuitry of claim 1, wherein the first selection circuitry is configured to select one of the first signal and the second signal based on a first control signal, and the second selection circuitry is configured to select one of the fourth signal, the fifth signal, and the sixth signal based on a second control signal, the first control signal differs from the second control signal.

4. The memory driver circuitry of claim 1, wherein the sixth signal is a ground signal.

5. The memory driver circuitry of claim 1, wherein the first selection circuitry is configured to select the first signal before initiation of a power on mode, and the first selection circuitry is configured to select the second signal after initiation of the power on mode.

6. The memory driver circuitry of claim 1, wherein the second driver path circuitry comprises:
   emulation circuitry configured to output the third signal, wherein parameters of transistors of the emulation circuitry are configured based on the parameters of transistors of the memory cell.

7. The memory driver circuitry of claim 6, wherein the second driver path circuitry further comprises:
   first amplifier circuitry and voltage divider circuitry configured to output a seventh signal; and
   second amplifier circuitry configured to receive the seventh signal and the third signal and generate the fifth signal based on the seventh signal and the third signal.

8. The memory driver circuitry of claim 7, wherein the emulation circuitry forms a feedback path for the second amplifier circuitry.

9. The memory driver circuitry of claim 6, wherein the second selection circuitry is configured to select the fourth signal before initiation of a power on mode, and the second selection circuitry is configured to select the fifth signal after initiation of the power on mode.

10. An integrated circuit (IC) device comprising:
    a memory cell;
    header circuitry configured to drive the memory cell; and
    memory driver circuitry comprising:
       first driver path circuitry comprising:
          driver circuitry configured to output a first signal; and
          first selection circuitry configured to receive the first signal and a second signal, and output a first selected signal, wherein the first selected signal is a selected one of the first signal and the second signal;
       second driver path circuitry configured to output a third signal; and
       second selection circuitry configured to receive a fourth signal, a fifth signal, and a sixth signal, and output a bias voltage signal to the header circuitry, wherein the bias voltage signal is a selected one of the fourth signal, the fifth signal, and the sixth signal, the fourth signal corresponds to the first selected signal, the fifth signal corresponds to the third signal, and the third signal is based on parameters of the memory cell.

11. The IC device of claim 10, wherein the first driver path circuitry further comprises buffer circuitry configured to receive the first selected signal and output the fourth signal.

12. The IC device of claim 10, wherein the first selection circuitry is configured to select the first signal before initiation of a power on mode, and the first selection circuitry is configured to select the second signal after initiation of the power on mode.

13. The IC device of claim 10, wherein the second driver path circuitry comprises:
    emulation circuitry configured to output the third signal, wherein parameters of transistors of the emulation circuitry are configured based on the parameters of transistors of the memory cell.

14. The IC device of claim 13, wherein the second driver path circuitry further comprises:
    first amplifier circuitry and voltage divider circuitry configured to output a seventh signal; and
    second amplifier circuitry configured to receive the seventh signal and the third signal and generate the fifth signal based on the seventh signal and the third signal.

15. The IC device of claim 14, wherein the emulation circuitry forms a feedback path for the second amplifier circuitry.

16. The IC device of claim 13, wherein the second selection circuitry is configured to select the fourth signal before initiation of a power on mode, and the second selection circuitry is configured to select the fifth signal after initiation of the power on mode.

17. A memory driver circuitry comprising:
first driver path circuitry comprising:
- driver circuitry configured to output a first signal; and
- first selection circuitry configured to receive the first signal and a second signal, and output a first selected signal, wherein the first selected signal is a selected one of the first signal and the second signal;

second driver path circuitry comprising:
- emulation circuitry configured to output a third signal, wherein parameters of transistors of the emulation circuitry are configured based on parameters of transistors of a memory cell; and
- second selection circuitry configured to receive a fourth signal, a fifth signal, and a sixth signal, and output a bias voltage signal to header circuitry connected to the memory cell, wherein: the bias voltage signal is a selected one of the fourth signal, the fifth signal, and the sixth signal; the fourth signal corresponds to the first selected signal; and the fifth signal corresponds to the third signal.

18. The memory driver circuitry of claim 17, wherein the first driver path circuitry further comprises buffer circuitry configured to receive the first selected signal and output the third signal.

19. The memory driver circuitry of claim 17, wherein the first selection circuitry is configured to select the first signal before initiation of a power on mode, and the second selection circuitry is configured to select the sixth signal after initiation of the power on mode.

20. The memory driver circuitry of claim 17, wherein the second driver path circuitry further comprises:
- first amplifier circuitry and voltage divider circuitry configured to output a seventh signal; and
- second amplifier circuitry configured to receive the third signal and the seventh signal and generate the fifth signal based on the third signal and the seventh signal, wherein the emulation circuitry forms a feedback path for the second amplifier circuitry.

* * * * *